United States Patent
Babu

(10) Patent No.: US 8,458,091 B2
(45) Date of Patent: Jun. 4, 2013

(54) SYSTEM AND METHOD FOR PRIORITIZING PROCESSING OF PAYMENT INSTRUCTIONS

(75) Inventor: C. Dominic Gerard Roshan Babu, Chennai (IN)

(73) Assignee: Accenture Global Services Limited, Dublin (IE)

(*) Notice: Subject to any disclaimer, the term of this patent is extended or adjusted under 35 U.S.C. 154(b) by 169 days.

(21) Appl. No.: 12/843,245

(22) Filed: Jul. 26, 2010

(65) Prior Publication Data

US 2012/0023016 A1   Jan. 26, 2012

(51) Int. Cl.
*G06Q 40/00* (2006.01)
*G08C 13/00* (2006.01)

(52) U.S. Cl.
CPC ............ *G08C 13/00* (2013.01); *G08C 2200/00* (2013.01); *G08C 2201/00* (2013.01)
USPC .......................................................... 705/40

(58) Field of Classification Search
CPC ... G08C 13/00; G08C 2200/00; G08C 2201/00
USPC .......................................................... 705/40
See application file for complete search history.

(56) References Cited

U.S. PATENT DOCUMENTS

| | | | | |
|---|---|---|---|---|
| 5,220,501 | A * | 6/1993 | Lawlor et al. | 705/40 |
| 6,076,074 | A * | 6/2000 | Cotton et al. | 705/40 |
| 6,490,568 | B1 * | 12/2002 | O'Mara et al. | 705/39 |
| 7,519,553 | B2 * | 4/2009 | Abe et al. | 705/35 |
| 7,533,060 | B2 * | 5/2009 | Hoyos et al. | 705/44 |
| 7,848,997 | B2 * | 12/2010 | Lejdstrom et al. | 705/37 |
| 7,945,491 | B2 * | 5/2011 | Sharma | 705/34 |
| 8,108,272 | B2 * | 1/2012 | Sorbe et al. | 705/30 |
| 2005/0015332 | A1 | 1/2005 | Chen | |
| 2005/0086165 | A1 * | 4/2005 | Pawelczyk et al. | 705/40 |
| 2005/0177499 | A1 | 8/2005 | Thomas | |
| 2006/0109857 | A1 * | 5/2006 | Herrmann | 370/412 |
| 2007/0219816 | A1 * | 9/2007 | Van Luchene et al. | 705/1 |
| 2007/0288347 | A1 | 12/2007 | Lejdstrom et al. | |
| 2010/0274718 | A1 * | 10/2010 | Ghosh et al. | 705/44 |

FOREIGN PATENT DOCUMENTS

WO         00/36571         6/2000

* cited by examiner

*Primary Examiner* — Ella Colbert
*Assistant Examiner* — Scott S Trotter
(74) *Attorney, Agent, or Firm* — Mannava & Kang, P.C.

(57) ABSTRACT

A prioritizing system and method are disclosed for prioritizing processing of payment instructions through a payment instruction processing system of a business entity. The method includes identifying a first set of rules determining a prioritization among a set of payment instructions. These include payment instructions related to payments from nostro accounts associated with the business entity and processed by other business entities. Also, the payment instructions have data fields for qualitative and quantitative attributes describing the payment instructions. The method also includes holding and ordering the payment instructions in a queue, determining a first sequence ordering the payment instructions in the queue based upon the first set of rules, and initiating processing of the payment instructions in the queue according to the first sequence.

28 Claims, 10 Drawing Sheets

Queue Timings for Automated Operations Screenshot
220

Queue Business Rules Parameterization Screenshot
230

Manual Operation of Queue Screenshot 240

Queue Processing Algorithm Setup Screenshot
250

Queue Summary Dashboard Screenshot
270

SYSTEM AND METHOD FOR PRIORITIZING PROCESSING OF PAYMENT INSTRUCTIONS

BACKGROUND

A primary function of banks and other financial institutions is to act as payment agents. For example, banks do this by managing checking and other accounts for customers, directly paying checks drawn by customers on the bank, and collecting checks deposited to customers' accounts. Banks enable customer payments via other payment methods such as telegraphic transfer, electronic fund transfer and automated teller machine transaction. Banks provide almost all types of commercially available payment services. Product-processors are operational sub-units within the bank for managing bank products, including the processing of payments associated with the bank products managed by a product-processor.

Banks provide a number of banking products using their respective different product-processors including savings accounts, checking accounts, credit cards, home loans, personal loans, business loans, mutual funds, revolving credit, term loans, financing, raised capital and risk management devices such as derivatives. All these product-processors utilize different forms of payment messages or payment instructions communicated through the bank for the respective products.

For banks to perform their payment functions associated with their banking product-processors, typically, payment instructions are exchanged between banks. In processing the inter-bank payment instructions, the banks use nostro and vostro accounts. The terms nostro and vostro are accounting terms used to distinguish an account a first bank holds for a second bank (i.e., a vostro account the first bank holds for the second) from an account a second bank holds for the first bank (i.e., a nostro account the second bank holds for the first bank).

A bank counts a nostro account with a credit balance as a cash asset in its balance sheet. Conversely, a vostro account with a credit balance (i.e. a deposit) is a liability, and a vostro with a debit balance (a loan) is an asset. Thus in many banks a credit entry on a nostro account (CR) is regarded as negative movement and a debit (DR) is positive. With the advent of computerized accounting, nostro accounts and vostro accounts just need to have opposite signs within any one bank's accounting system; that is, if a nostro in credit has a positive sign, then a vostro in credit must have a negative sign. Nostro and vostro accounts are commonly used for currency settlement, where a bank or other financial institution needs to hold balances in a currency other than its home currency.

One type of payment instruction for international communications is the SWIFT (Society for Worldwide Interbank Financial Telecommunication) message. The SWIFT provides a SWIFT network to allow financial and other institutions to transfer financial transactions through a financial message payment instruction, which may be embodied in a SWIFT message. SWIFT messages consist of five blocks of data including headers, message content, and a trailer. Message types are crucial to identifying content. All SWIFT messages include the literal "MT" (Message Type). This is followed by a 3-digit number that denotes the message type, category, and group.

Consider the following example, which is an order to buy or sell via a third party: MT304. The first digit (3) represents the category. A category denotes messages that relate to particular financial instruments or services such as precious metals (6), treasury (3), or travelers checks (8). The category denoted by 3 is treasury markets. The second digit (0) represents a group of related parts in a transaction life cycle. The group indicated by 0 is a Financial Institution Transfer (FIT). The third digit (4) is the type that denotes the specific message. The type represented by 4 is a notification. There are several hundred message types across the types, categories and groups for payment instructions arising through different bank product-processors. Table I below is a listing of categories for SWIFT message types.

TABLE I

| Message Type | Description |
| --- | --- |
| MT0xx | System Messages |
| MT1xx | Customer Payments and Checks |
| MT2xx | Financial Institution Transfers |
| MT3xx | Treasury Markets |
| MT4xx | Collection and Cash Letters |
| MT5xx | Securities Markets |
| MT6xx | Treasury Markets - Metals and Syndications |
| MT7xx | Documentary Credits and Guarantees |
| MT8xx | Traveler's Checks |
| MT9xx | Cash Management and Customer Status |

Efficiently managing and effectively processing SWIFT messages by a bank is important for servicing the bank's clients and for maintaining business relationships with other banks. The payment instructions in the SWIFT messages need to be processed as quickly as possible for meeting the service desires of the bank's customers. At the same time, the quick processing of payment instructions requested by customers needs to be prioritized against the bank's operational requirements for meeting the time constraints imposed for processing incoming payment instructions sent by the bank. These constraints can be set internally by other banks for their acceptance of new payment instructions to be processed at the other bank. Or there can be time constraints due to such things as the national regulatory requirements on the other banks in different countries.

The quick processing of payment instructions also needs to be balanced against a bank's asset management limitations, such as the cash reserves which the bank holds for making payments and meeting the minimum balance requirements for the banks' nostro accounts at other banks.

If the payment instructions are processed for customers without regard to the internal limitations at the bank for operations or asset management, the bank's business relationships with other banks may suffer or the bank may have to pay overdraft fees for overdrawing on its nostro accounts. On the other hand, if the payment instructions are unduly delayed in order to meet the above described internal limitations at the bank, then the delays can negatively impact customer satisfaction, possibly resulting in the loss of customers or the incurrence of liability on the bank customer or the bank itself.

BRIEF SUMMARY OF THE INVENTION

According to one embodiment, the disclosure presents a prioritizing system. It is configured to prioritize processing of payment instructions through a payment instruction processing system of a business entity. The prioritizing system includes a data storage device configured to store a set of payment instructions including payment instructions related to payments from nostro accounts associated with the business entity and processed by other business entities. The payment instructions have data fields for qualitative and quantitative attributes describing the payment instructions, a first set of rules determining a prioritization among the set of payment instructions, a queue holding and ordering the payment instructions, and a first sequence ordering the payment instructions in the queue based upon the first set of rules. The system also includes a processor configured to identify the first set of rules, determine the first sequence by applying the first set of rules and initiate processing of the payment instructions in the queue according to the first sequence.

According to another embodiment, the disclosure presents a prioritizing system wherein the set of payment instructions is associated with a plurality of different product processors of the business entity providing the payment instructions.

According to another embodiment, the disclosure presents a prioritizing system wherein the processor is configured to assign an additional payment instruction to the queue, determine a second sequence for ordering the payment instructions in the queue based upon the first set of rules, order the payment instructions in the queue according to the second sequence and initiate processing of the payment instructions in the queue according to the second sequence.

According to another embodiment, the disclosure presents a prioritizing system wherein the processor is configured to identify a payment instruction from the queue to be processed out of order from the first sequence, remove the identified payment instruction from the queue, determine a second sequence for ordering the payment instructions in the queue based upon the first set of rules, order the payment instructions in the queue according to the second sequence, and initiate processing of the payment instructions in the queue according to the second sequence.

According to another embodiment, the disclosure presents a prioritizing system wherein the processor is configured to identify a second set of rules for determining a prioritization among a set of payment instructions, wherein the second set of rules includes a modification to the first set of rules or a new rule, determine a second sequence for ordering the payment instructions in the queue based upon the second set of rules for determining the prioritization, order the payment instructions in the queue according to the second sequence; and initiate processing of the payment instructions in the queue according to the second sequence.

According to another embodiment, the disclosure presents a prioritizing system wherein a rule in the first set of rules includes a parameter for determining a sequence for ordering the payment instructions in the queue, the parameter includes at least one of a payment value amount, a payment value date, an originator identity, a payment date, a currency of payment, a country of a recipient, a priority which is associated with the payment instructions in the queue, a product-processor of the business entity, a balance in a nostro account in the set of nostro accounts associated with the business entity, and an identity of a business entity from the other business entities processing payments from the set of nostro accounts associated with the business entity.

According to another embodiment, the disclosure presents a prioritizing system wherein the payment instructions in the set of payment instructions are SWIFT (Society for Worldwide Interbank Financial Telecommunications) messages or wherein the SWIFT messages are MT103 or MT202 messages.

According to another embodiment, the disclosure presents a prioritizing system configured to prioritize processing of payment instructions through a payment instruction processing system of a business entity. The prioritizing system includes a queue holding payment instructions to be processed, wherein the payment instructions describe payments from nostro accounts associated with a business entity and processed by other business entities. The payment instructions have qualitative and quantitative attributes describing the payment instructions. The prioritizing system also includes a queue manager module configured to identify a first set of rules associated with the qualitative and quantitative attributes, determine a first sequence by applying the first set of rules, and order the payment instructions in the queue according to the first sequence. The prioritizing system also includes a processing module configured to process the payment instructions in the queue according to the first sequence.

According to another embodiment, the disclosure presents a method for prioritizing processing of payment instructions through a payment instruction processing system of a business entity. The method includes identifying a first set of rules determining a prioritization among a set of payment instructions including payment instructions related to payments from nostro accounts associated with the business entity and processed by other business entities. The payment instructions have data fields for qualitative and quantitative attributes describing the payment instructions, holding and ordering the payment instructions in a queue, determining a first sequence ordering the payment instructions in the queue based upon the first set of rules, and initiating processing of the payment instructions in the queue according to the first sequence.

According to another embodiment, the disclosure presents a computer readable medium including instructions executable on at least one processor for executing a method for prioritizing processing of payment instructions through a payment instruction processing system of a business entity. The method includes identifying a first set of rules determining a prioritization among a set of payment instructions including payment instructions related to payments from nostro accounts associated with the business entity and processed by other business entities, wherein the payment instructions have data fields for qualitative and quantitative attributes describing the payment instructions, holding and ordering the payment instructions in a queue, determining a first sequence ordering the payment instructions in the queue based upon the first set of rules and initiating processing of the payment instructions in the queue according to the first sequence.

BRIEF DESCRIPTION OF DRAWINGS

Embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

A payment instruction processing (PIP) system, according to an embodiment, organizes payment instructions for payments relating to transactions arising from different product-processor divisions in a bank. It enhances the efficiency by which these transactions debit and credit a bank's nostro account. The PIP system does this by controlling the processing of the nostro account transactions using configurable business priority rules based on the parameters chosen for those priority rules at the bank. Through the PIP system, a bank can easily prioritize payments and continuously monitor account balances. Accordingly, through use of the PIP system, banks are less likely to incur fees and liability resulting from overdrafts or from failure to timely make payments. The PIP system is generally described as being used by banks. However, the PIP system may be used by any entity that processes payments.

1. System

Figure 1:
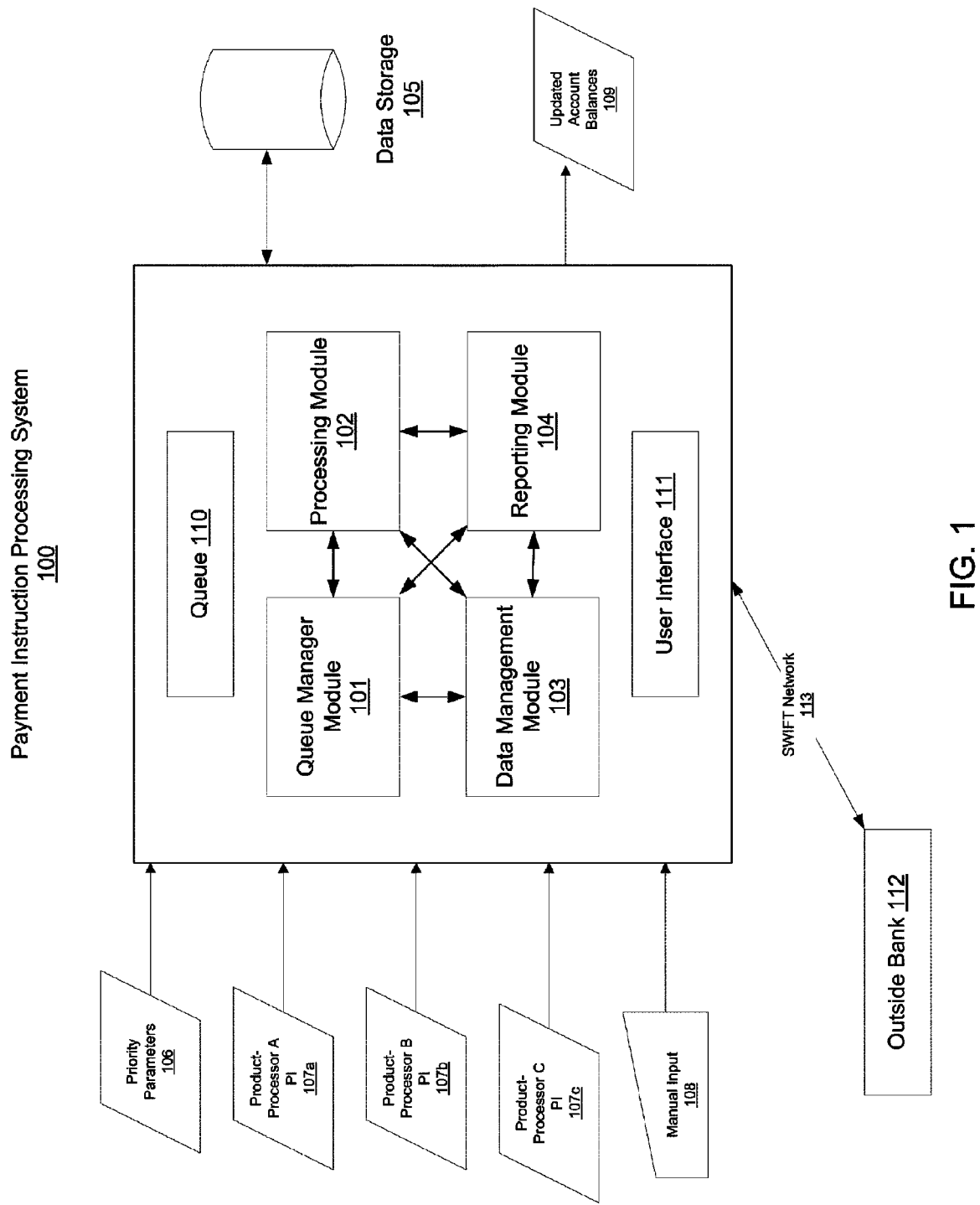
FIG. 1 illustrates a payment instruction processing system, according to an embodiment.

FIG. 1 illustrates a payment instruction processing (PIP) system 100, according to an embodiment. The PIP system 100 includes a data storage 105, a queue manager module 101, a processing module 102, a data management module 103, and a reporting module 104. These modules in the PIP system 100 can operate separately as separate modules in the PIP system 100, or can operate in a combined operation of the PIP system 100, as one or more combination modules in the PIP system 100.

The PIP system 100 receives priority parameters 106 and payment instructions (PI) from different product-processors in the entity such as product-processor A payment instructions 107a, product-processor B payment instructions 107b and product-processor C payment instructions 107c. The payment instructions typically have data fields for qualitative and quantitative attributes for describing the payment instructions. Quantitative attributes typically describe, among other things, the monetary amounts and times which are associated with the payment instructions. Qualitative attributes typically describe, among other things, the persons, places and other things, generally not measured by numerical amounts, which are associated with the payment instructions. The priority rules are determined by the priority parameters 106 found in the payment instruction data fields. The priority rules include logic instructions formulating priority rules for the prioritization of payment instructions 107 (inclusive of payment instructions 107a-107c) of a bank or any business entity which is utilizing PIP system 100. The priority parameters 106 may include one or more criteria for prioritizing payment instructions. The criteria, for example, may be associated with the value date of the payment instruction, the value amount of the payment instruction, the currency of the payment instruction, the country of the payment recipient or other criteria as bases for prioritization.

The payment instructions 107 are data describing payments of a bank or any entity which is utilizing the PIP system 100. The payment instructions 107 can arise through any of the bank product-processors including those managing savings accounts, checking accounts, credit cards, home loans, personal loans, business loans, mutual funds, revolving credit, term loans, financing, raised capital and risk management devices such as derivatives. The payment instructions may describe the payments to be made through the banks nostro accounts held at other banks or entities holding the nostro accounts. The priority parameters 106 and the payment instructions 107 are stored in the data storage 105 of the PIP system 100.

The queue manager module 101 may utilize priority parameters 106 and the payment instructions 107 to prioritize payment instructions in a queue 110. Only one queue 110 is shown by way of example. However, the payment instructions 107 can be organized into one queue 110, or into a plurality of queues and/or sub-queues such as Q1, Q2, Q3 or Q4 (not shown). The queue manager module 101 can organize multiple queues based on the priority parameters 106, the payment instructions 107 and a manual input 108. Also, queue 110, which is shown outside data storage 105, may be stored in data storage 105 as a data structure including metadata identifying the sequence of payment instructions in the queue 110.

According to an embodiment, the queue manager module 101 identifies a first set of rules from the priority parameters 106 for prioritizing the payment instructions for a given queue. For instance, payment instructions having a value amount above a dollar threshold to be paid out of nostro accounts in banks of a specified country may be given highest priority in a priority rule for first processing by processing module 102. In a further example, payment instructions arising from a specified product—processor in the bank may be given a lower priority in a second priority rule for processing after the payments instructions according to the first rule. Those payment instructions in the payment instructions 107 meeting the criteria of either of these two rules are both assigned into the queue 110 for processing according to their prioritization determined by the first rule and second rule.

In another example for illustrative purposes, the payment instructions corresponding to the first rule may be assigned to a queue Q1 (not shown) and the payment instructions corresponding to the second rule may be assigned to a queue Q2 (not shown). Queues Q1 and Q2 are then executed in the sequence Q1, Q2. In the instance that processing is closed on Q1 before the payment instructions are completely processed, and then Q2 begins processing its payment instructions while Q1 is closed. The sequence can be reversed to Q2, Q1. For instance, according to one embodiment, separate queues, Q1 through Q4, are processed in the order of Q1, Q4, Q3, and Q2. In this embodiment Q1 is a highest priority queue, so all messages in Q1 are processed first and then messages in Q4 are processed, then messages in Q3 are processed and finally messages in Q2 are processed.

Other permutations and variations are possible, such as when new payment instructions are added to queue 110, Q1 or Q2. Another instance is if any rules are removed from a queue, or if the priority rules are changed as applied to the sequence of processing the payment instructions in any queue. The priority rules can be applied to queue 110, for instance, by manual input 108 through a user interface 111 or according to pre-configured rules.

The variation on priority rules and queue organization is not limited and can be set according to bank policy or user preferences. After the priority rules are chosen, the queue manager module 101 then assigns to the queue 110 a set of payment instructions. Then, the queue manager module 101 determines a sequence for the set of payment instructions in the queue 110 based upon the first set of rules. The queue manager module 101 orders the payment instructions in the queue 110 into the determined sequence so that the payment instructions can be accepted into the processing module 102 for processing according to the determined sequence.

The processing module 102 associates each payment instruction with an outside bank 112 or another financial entity (not shown) associated with a nostro account affected by the payment instruction. The payment instruction is then communicated to the outside bank 112. Although the channel for communicating payment messages is not limited, a SWIFT network 113 is shown for illustrative purposes. As noted above, the outside bank 112 that manages the nostro accounts are typically in another country from the bank with the PIP system 100. The outside bank 112 holds the nostro account funds, typically in the currency of the country in which the outside bank 112 is situated. The processing module 102 sends a communication, typically by the SWIFT network 113, to the outside bank 112 to make payment from the nostro account held by the outside bank 112.

Another function of the processing module 102 is to notify the queue manager module 101 if it has accepted a payment instruction from the queue 110 and to notify the queue manager module 101 if a payment instruction cannot be processed. This is done so the payment instruction can be reprocessed through the PIP system 100 at a subsequent time when the payment instruction can be completed so as to fulfill the bank's payment obligation.

The manual input 108 is used to manually close or open the queue 110, so that payment instructions in the queue 110 are either processed or stopped from processing. This is typically done within a bank when a cut-off period for sending payment instructions is approaching and the priority rules may require an intervention to ensure certain specific payment instructions are processed. Other reasons can include system maintenance, and the like.

The manual input 108 may also be used to manually prioritize a payment instruction so that it has the highest priority and will be the next one to be processed in the queue 110. For example, if a payment instruction which lies in the queue 110 having least priority among other queues in the queue manager module 101 is re-prioritized, and then the payment instruction will be moved to the top of the highest priority queue to be processed. According to another embodiment, a flag may be placed for a payment instruction in the queue 110 indicating it has been reprioritized and is to be processed earlier than higher priority payment instructions in the queue 110. Also, if the flag is removed, then a reprioritized payment instruction is processed in the same order of the original queue priority in which it was assigned.

Payment instructions may be processed in response to manual input 108, as described above. However, in most instances, the payment instructions are processed according to the sequence of the payment instructions in the queue 110 determined by the queue manager module 101. The sequence indicates an order of processing the payment instructions. For example, the sequence indicates a priority of each message from a highest priority to a lowest priority, and each is processed according to its prioritization determined by the priority rules and the priority parameters 106 found in the payment instruction data fields. For example, the highest priority is processed first, the next highest is processed second, and so on.

The highest priority queue may be recreated to accommodate changes to priority rules are to take effect when an actual date changes to a next value date. If the actual date changes to the next value date, changes to the queue based on a new current system date are evaluated to determine how a payment instruction is to be sequenced according to the changed priority rules. This feature can be useful when new priority rules are introduced to take effect on a given date. For example, if Q3 holds all future valued payments and if it holds payment instructions accorded to a next day value, and then if the PIP system 100 changes the system date, then all payment instructions will be moved to the current value date queue.

According to another embodiment, the PIP system 100 can accommodate manual input 108 to set a time for each queue when it is opened and closed automatically. For example, Q1 can be open between 9 am to 10 am and Q2 can be open between 9.30 am to 11.30 am, and so on. According to another embodiment, separate queues are configurable for inbound payment instructions relating to vostro accounts held by the bank with the PIP system 100 and outbound payment instructions for nostro accounts, as described above.

The PIP system 100 can also include the data management module 103 and the reporting module 104. The data management module 103 can be used, among other things, to store the priority parameters 106, the payment instructions 107 and the manual input 108 received by the PIP system 100, the determined sequence, and the payment instructions in the queue 110 and their removal from the queue 110 after they are accepted for processing in the processing module 102, and updated account balances 109 relating to changes to the nostro accounts resulting from payments made pursuant to the payment instructions. The reporting module 104 can be used, among other things, to retrieve and send the data stored on the storage device 105 to other systems in or associated with the bank having the PIP system 100. For instance, the data management module can store minimum balance information regarding a nostro account at the outside bank 112 while the reporting module 104 sends the updated account balances 109 to other systems in the bank having the PIP system 100.

2. Screenshots

Figure 2A:
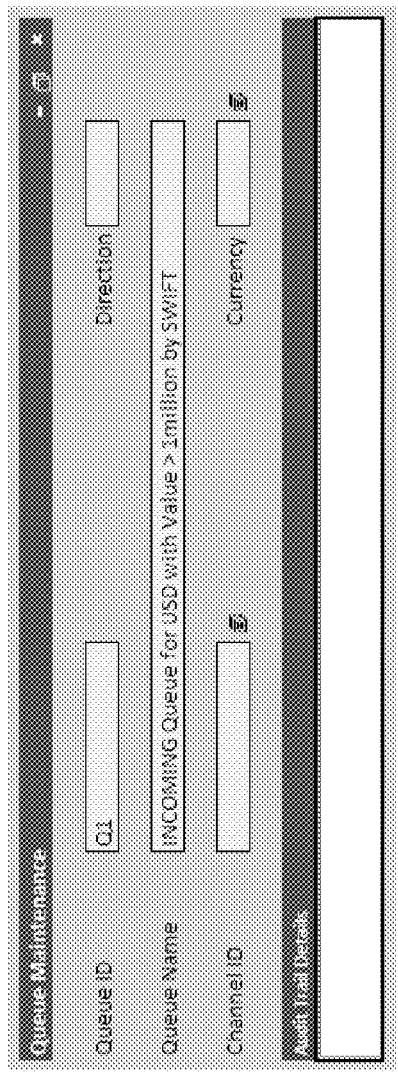
FIGS. 2A-2G illustrate screen shots for a user interface for interacting with a payment instruction processing system, according to an embodiment.

FIGS. 2A-G show examples of screenshots that may be generated through the user interface 111. FIG. 2A illustrates a queue maintenance screenshot 210. This screen is used to maintain different queues identified by queue ID and queue name in the PIP system 100. Queue maintenance is performed to capture queue names along with the direction of the payment instructions (incoming/outgoing) and the various channels for which the queue is being captured (SWIFT, etc). The queue ID is Q1 and the queue name is "INCOMING Queue for USD with value>1 million by SWIFT".

Figure 2B:
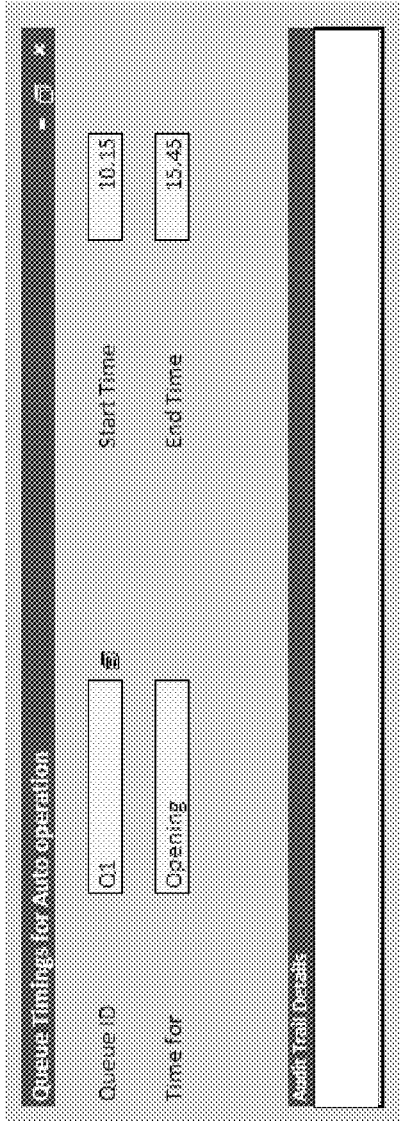

FIG. 2B illustrates queue timing for automated operations screenshot 220. This screen is used to set up a time at which a particular queue should be open or closed. At the given start time, the queue will be either open or closed based on the parameter in the time for field. At other times, this queue will be either closed/open based on the configuration for the time for field. According to this embodiment, the queue ID is Q1 and the time for field is for opening at a start time 10.15 and an end time 15.45.

Figure 2C:
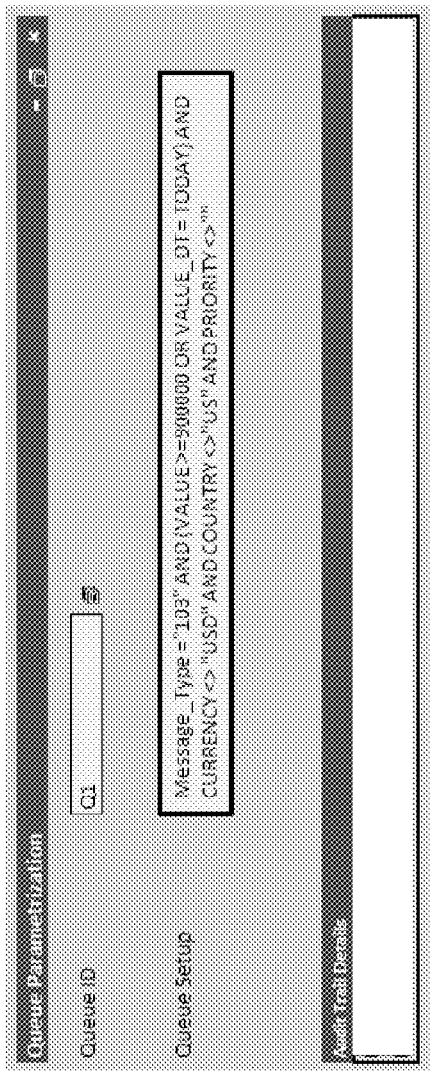

FIG. 2C illustrates a queue business rules parameterization screenshot 230. This screen is used to configure the various parameters for a queue, based on which the payment instruction when routed to the queue manager module 101 will be put into the appropriate queue for processing. It will be based on these parameters that a message will be routed to Q1, Q2 or Q3, and so on. According to this embodiment, the queue ID is Q1 and the queue setup field is MT-103, value>=900,000, value date=today, currency USD, country US and unspecified priority.

Figure 2D:
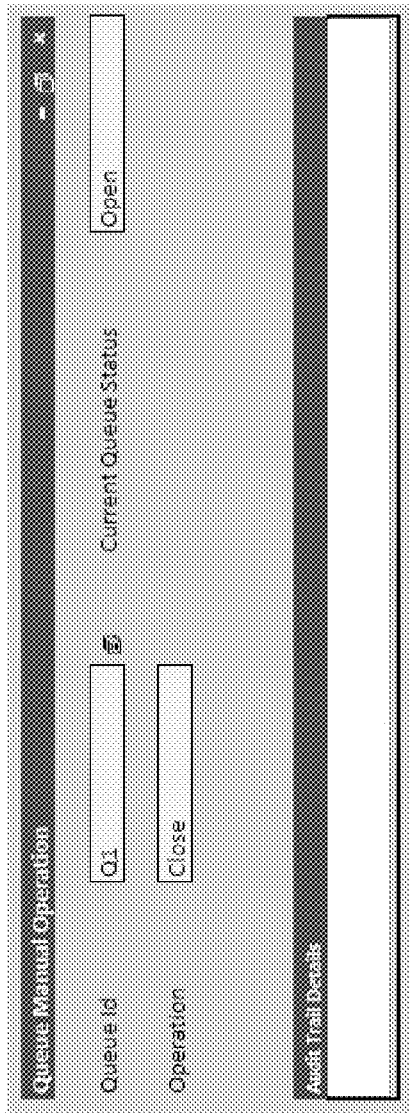

FIG. 2D illustrates a manual operation of queue screenshot 240. This screen is used to close an open queue or open a closed queue. According to this embodiment, the queue ID is Q1, the queue status is open and the operation is to close the queue.

Figure 2E:
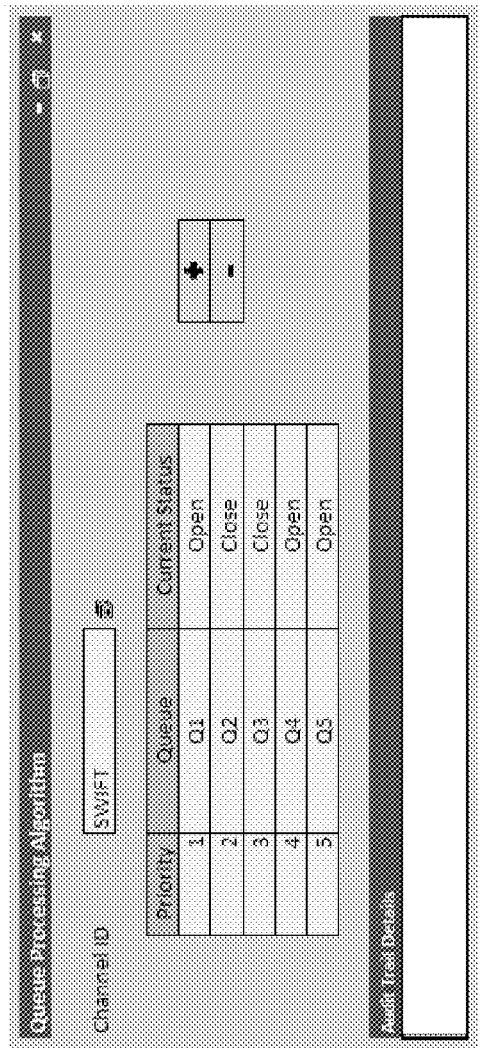

FIG. 2E illustrates a queue processing algorithm setup screenshot 250. This screen is used to set up the processing logic, i.e. the sequence in which the PIP system 100 processes the payment instructions across different queues for a given channel. According to this embodiment, the channel ID is SWIFT, the first priority is given to queue Q1 having a current status open, the second priority is given to queue Q2 having a current status close, and so on, through the fifth priority given to queue Q5 having a current status open.

Figure 2F:
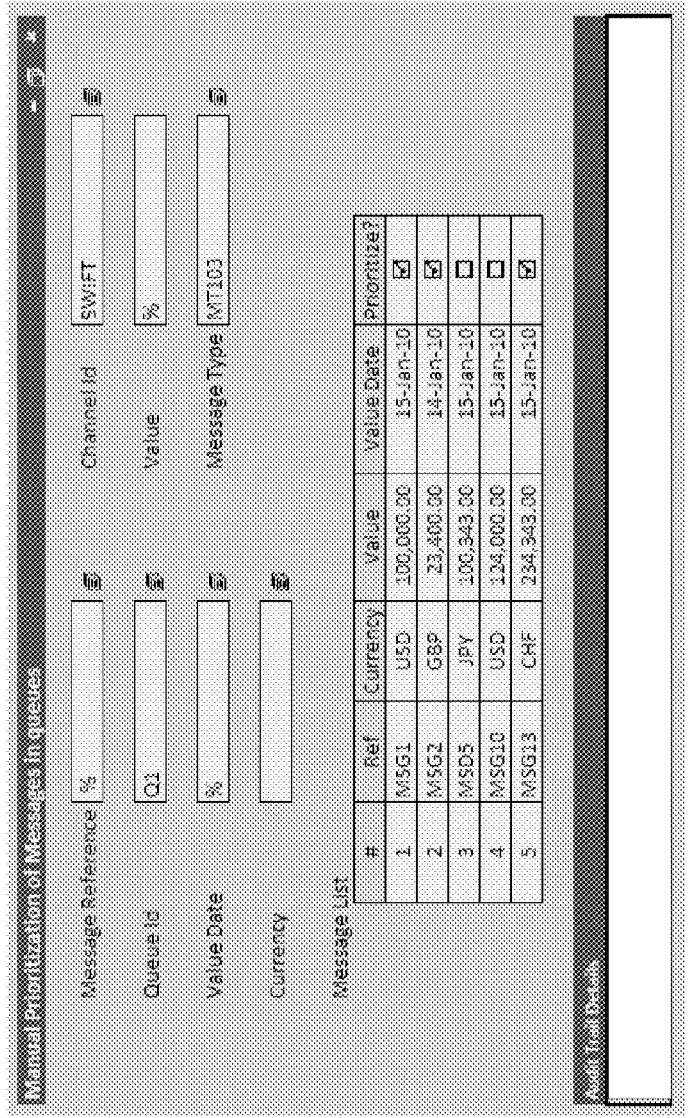

FIG. 2F illustrates a manual prioritization of queue screenshot 260. In this screen, the term message is used in place of the term payment instruction. In this screen, a user can execute a query based on the criteria of the message such as message number, reference, currency, value, value date and priority. According to this embodiment, the channel ID is SWIFT, the queue ID is Q1 and the message type is MT103.

Figure 2G:

FIG. 2G illustrates a queue summary dashboard screenshot 270. In this screen, the term message is used in place of the term payment instruction. This screen is a query screen where the user will be able to view the status of various messages and the status of the queue as well. This screen can be used by the users to query on the all the messages that are in the payment instruction queue.

3. Methods

Figure 3:
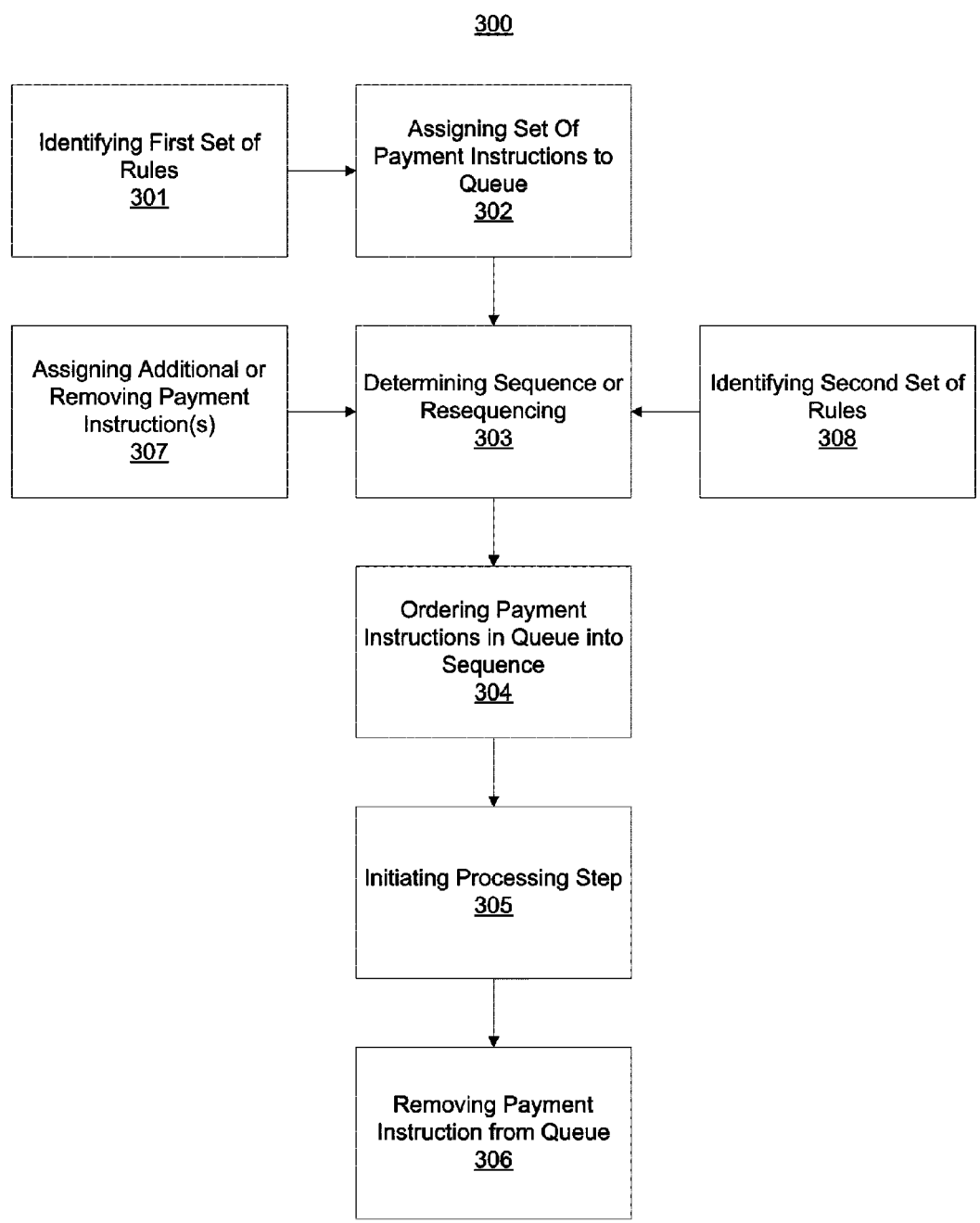
FIG. 3 illustrates a method for prioritizing and processing payment instructions using the payment instruction processing system shown in FIG. 1, according to an embodiment.

FIG. 3 illustrates a method 300 for prioritizing payment instructions for processing the payment instructions through a payment instruction processing system of a business entity, according to an embodiment. The method 300 is described with respect to the PIP system shown in FIG. 1 by way of example and not limitation, and this method may be performed in other systems.

Referring to FIG. 3, at step 301 the PIP system 100 identifies a first set of rules for determining a prioritization among a set of payment instructions taken from payment instructions 107. The payment instructions in the set of payment instructions typically relate to payments from a set of nostro accounts associated with the business entity and processed by other business entities, such as the outside bank 112. Also, the payment instructions typically have data fields for qualitative and quantitative attributes for describing the payment instructions.

At step 302, the queue manager module 101 in the PIP system 100 assigns the set of payment instructions to the queue 110, so the payment instructions can be processed by processing module 102.

At step 303, the queue manager module 101 determines a first sequence for ordering the payment instructions in the queue 110 based upon the first set of rules for determining the prioritization.

At step 304, queue manager module 101 holds and orders the payment instructions in queue 110 according to the first sequence. Holding may include storing the payment instructions or storing metadata for the payment instructions to identify the ordering for processing.

At step 305, processing module 102 initiates processing of the payment instructions in queue 110 according to the first sequence. For example, the first payment instruction in the first sequence is selected and removed, at step 306, from the ordered payment instructions in queue 110 for processing. A next payment instruction in the first sequence is selected and removed from the ordered payment instructions in queue 110 for processing, and so on.

In many instances, additional payment instructions are received for the queues after an initial sequencing is performed. In these instances, the payment instructions in the queue, including the new payment instructions are resequenced. The resequencing may be performed each time a new payment instruction is received or periodically or after a predetermined number of payment instructions are received. Step 307 describes resequencing when one or more new payment instructions are received for the queue 110 prior to the resequencing. The queue manager module 101 assigns an additional payment instruction to queue 110 for entering a processing step performed by the payment instruction processing system 100. Queue manager module 101 determines a second sequence for ordering the payment instructions in queue 110 based upon the first set of rules for determining the prioritization. Then queue manager module 101 orders the payment instructions in queue 110 according to the second sequence. Then processing module 102 initiates the processing step for the payment instructions in queue 110. A next payment instruction is selected and removed from queue 110 for processing according to the determined second sequence of payment instructions in queue 110.

The PIP system 100, as described above, allows users to modify rules, add new rules and/or remove rules. Thus, the first set of rules identified at step 301 may change at any time. Step 308 describes a situation where one or more of the rules in the first set of rules that are applicable to the queue 110 are modified. This modified set is referred to as a second set of rules. At step 308, PIP system 100 identifies the second set of rules for determining a prioritization among a set of payment instructions. Then queue manager module 101 determines a new sequence for ordering the payment instructions in queue 110 based upon the second set of rules for determining the prioritization. Then queue manager module 101 orders the payment instructions in queue 110 according to the new sequence. Then processing module 102 initiates the processing step for the payment instructions in queue 110. A next payment instruction is selected and removed from queue 110 for processing according to the determined new sequence of payment instructions in queue 110.

4. Other Aspects

Other aspects are associated with systems and methods for a payment instruction processing system, such as the payment instruction processing system 100. These other aspects include a more economical use of memory in a computer system for the payment instruction processing system 100 used in the collection of payment instructions 107 and the production of updated account balances 109. For instance, by organizing the payment instructions according to the prioritization rules in queue 110, the random access memory required to process payment instructions in queue 110 is minimized. The processor 401 does not need to fully evaluate all the data fields in all the payment instructions as it processes them from queue 110 for payment. This reduces the number of cycles required by processor 401 and the number of accesses to the data storage 105 and/or data storage device 402. The processor 401 can rely, to some extent, on the prioritization rules associated with the payment instructions as they are ordered in queue 110. The processor 401 can utilize the sequence in a queue to initiate processing to reduce the number of accesses to the data storage device 402 to determine a priority of the payment instructions in the queue. Also, the total number of pending payment instructions is minimized as payment instructions are processed faster, for instance, due to the reduced need for manual interventions in the payment instruction processing system 100. This reduces the memory required for storing payment instructions in data storage 105.

Another aspect is a more efficient process and strategy for searching a database including payment instructions in queue 110 which are stored in the data storage 105. Since the payment instructions in queue 110 have been ordered according to previously set prioritization rules, a database search query for specific pending payment instructions in queue 110 can utilize the previously set prioritization rules to expedite the process of identifying those payment instructions in the queue 110 which are the target of the database search query. Thus, the payment instruction processing system 100, using the prioritization rules, provides a more efficient database search strategy and higher speed processing of payment instructions. Also, by organizing the payment instructions in the queue 110, the payment instruction processing system 100 achieves a minimized load of data processing due to manual interventions. Thus, the queue 110 provides a technical tool for efficient search, retrieval and evaluation of payment instructions in the payment instruction processing system.

Another aspect is an improved user interface as provided, for instance, through the manual prioritization of queue screenshot 260 or the queue summary dashboard screenshot 270, as both of these are viewed through the user interface 111. These screens for the user interface 111 give the user added convenience when reviewing data regarding different kinds of payment instructions from different product—processors within a bank. For instance, queue summary dashboard screenshot 270 enables an expedited review of payment instruction in queue 110 according to currency, message type value date, etc. Because the screenshot provides titled columns and summary figures, the facility for the user in accessing and comprehending the displayed information is enhanced. Also, the arrangement of menu items and images on a screen in user interface 111 is determined by technical considerations aimed at enhancing the user ability to manage the technical task of monitoring payment instruction processing and tracking or planning for changes to a bank's nostro account balances.

The functions/steps of processing the payment instructions provide information to the user in the form of a technical tool for an intellectual task the user has to master. This contributes to the solution of the technical problem of efficient search, retrieval and evaluation of payment instruction processing and tracking a bank's nostro account balances. The easily used user interface 111 allows the user to grasp the payment instruction progress and bank's nostro account balance situation faster and more accurately, thus facilitating bank activity, and resulting in an improved, continued man-machine interaction.

5. Computer System for Executing Software

One or more of the steps and functions described herein and one or more of the components of the systems described herein may be implemented as computer code stored on a computer readable storage device, such as memory or another type of storage device. The computer code is executed on a computer system (e.g., computer system 400 described below), for example, by a processor, application-specific integrated circuit (ASIC), or other type of circuit. The code may exist as software program(s) comprised of program instructions in source code, object code, executable code or other formats.

Figure 4:
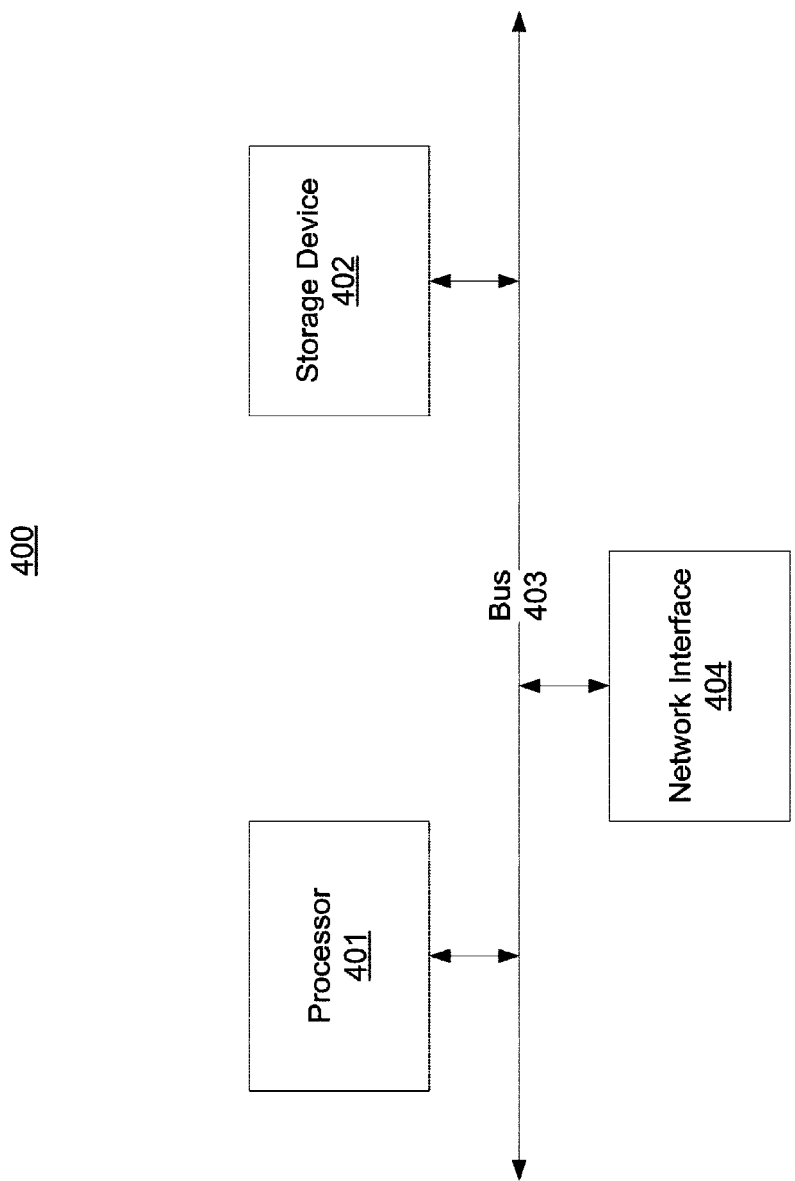
FIG. 4 illustrates a computer system configured to provide a hardware platform for the payment instruction processing system shown in FIG. 1, according to an embodiment.

FIG. 4 shows a computer system 400 that may be used as a hardware platform for the payment instruction processing system 100. Computer system 400 may be used as a platform for executing one or more of the steps, methods, and functions described herein that may be embodied as software stored on one or more computer readable storage devices, which are hardware storage devices.

The computer system 400 includes a processor 401 or processing circuitry that may implement or execute software instructions performing some or all of the methods, functions and other steps described herein. Commands and data from processor 401 are communicated over a communication bus 403. Computer system 400 also includes a computer readable storage device 402, such as random access memory (RAM), where the software and data for processor 401 may reside during runtime. Storage device 402 may also include non-volatile data storage. Computer system 400 may include a network interface 404 for connecting to a network. It is apparent to one of ordinary skill in the art that other known electronic components may be added or substituted in computer system 400.

Furthermore, the system and methods described herein are generally described with respect to processing payments instructions for banks and nostro accounts. However, the system and methods are applicable to processing payment instructions for other types of entities and other types of accounts.

While the embodiments have been described with reference to examples, those skilled in the art are able to make various modifications to the described embodiments without departing from the scope of the embodiments as described in the following claims, and their equivalents.

What is claimed is:

1. A prioritizing system configured to prioritize processing of payment instructions through a payment instruction processing system of a business entity, the prioritizing system comprising:
  a data storage device storing
    a set of payment instructions including payment instructions related to payments from nostro accounts associated with the business entity and processed by other business entities, wherein the payment instructions have data fields for qualitative and
  quantitative attributes describing the payment instructions,
    a first set of rules determining a prioritization among the set of payment instructions,
    a queue holding and ordering the payment instructions, and
    a first sequence ordering the payment instructions in the queue based upon the first set of rules; and
  a processor
    identifying the first set of rules,
    determining the first sequence by applying the first set of rules,
    initiating processing of the payment instructions in the queue according to the first sequence,
    receiving a user selection of a payment instruction from the queue to be processed out of order from the first sequence,
    removing the selected payment instruction from the queue,
    determining a second sequence for ordering the payment instructions in the queue based upon the first set of rules,
    ordering the payment instructions in the queue according to the second sequence, and
    initiating processing of the payment instructions in the queue according to the second sequence,
  wherein a rule in the first set of rules includes a combination of parameters for determining a sequence for ordering the payment instructions in the queue, the parameters including
    a payment value amount,
    a payment value date,
    an originator identity,
    a payment date,
    a currency of payment, and
    a country of a recipient.

2. The prioritizing system of claim 1, wherein the set of payment instructions is associated with a plurality of different product processors of the business entity providing the payment instructions.

3. The prioritizing system of claim 1, wherein the processor assigns an additional payment instruction to the queue, determines a second sequence for ordering the payment instructions in the queue based upon the first set of rules,
orders the payment instructions in the queue according to the second sequence, and
initiates processing of the payment instructions in the queue according to the second sequence.

4. The prioritizing system of claim 1, wherein the processor sets a time the queue is opened and a subsequent time the queue is closed in response to time parameter settings, and any instructions in the queue are not processed if the queue is closed.

5. The prioritizing system of claim 1, wherein the processor
identifies a second set of rules for determining a prioritization among a set of payment instructions, wherein the second set of rules includes a modification to the first set of rules or a new rule,
determines a second sequence for ordering the payment instructions in the queue based upon the second set of rules for determining the prioritization,
orders the payment instructions in the queue according to the second sequence, and
initiates processing of the payment instructions in the queue according to the second sequence.

6. The prioritizing system of claim 1, wherein the rule in the first set of rules includes additional parameters for determining the sequence for ordering the payment instructions in the queue, the additional parameters including
a priority which is associated with the payment instructions in the queue,
a product-processor of the business entity,
a balance in a nostro account in the set of nostro accounts associated with the business entity, and
an identity of a business entity from the other business entities processing payments from the set of nostro accounts associated with the business entity.

7. The prioritizing system of claim 1, wherein the payment instructions in the set of payment instructions are SWIFT (Society for Worldwide Interbank Financial Telecommunications) messages.

8. The prioritizing system of claim 1, wherein the processor determines data accesses to the data storage device according to the first sequence identifying an order for processing the payment instructions in the queue.

9. A prioritizing system configured to prioritize processing of payment instructions through a payment instruction processing system of a business entity, the prioritizing system comprising:
a queue in a data storage device holding electronic payment instructions to be processed, wherein the payment instructions describe payments from nostro accounts associated with a business entity and processed by other business entities and the payment instructions have qualitative and quantitative attributes describing the payment instructions;
a queue manager module identifying a first set of rules associated with the qualitative and quantitative attributes, determine a first sequence by applying the first set of rules, and order the payment instructions in the queue according to the first sequence; and
a processing module, executed by a processor,
processing the payment instructions in the queue according to the first sequence,
determining a payment instruction from the queue to be processed out of order from the first sequence, wherein the payment instruction is determined from a user selection of the payment instruction from the queue,
removing the identified payment instruction from the queue,
determining a second sequence for ordering the payment instructions in the queue based upon the first set of rules,
ordering the payment instructions in the queue according to the second sequence, and
initiating processing of the payment instructions in the queue according to the second sequence,
wherein a rule in the first set of rules includes a combination of parameters for determining a sequence for ordering the payment instructions in the queue, the parameters including
a payment value amount,
a payment value date,
an originator identity,
a payment date,
a currency of payment, and
a country of a recipient.

10. The prioritizing system of claim 9, wherein the payment instructions are associated with a plurality of different product processors of the business entity providing the payment instructions.

11. The prioritizing system of claim 9, wherein the processing module determines data accesses to a data storage device according to the first sequence identifying priorities for processing the payment instructions in the queue.

12. The prioritizing system of claim 9, wherein the processor sets a time the queue is opened and a subsequent time the queue is closed in response to time parameter settings, and any instructions in the queue are not processed if the queue is closed.

13. The prioritizing system of claim 9, wherein the queue manager module
identifies a second set of rules for determining a prioritization among the payment instructions in the queue, wherein the second set of rules includes a modification to the first set of rules,
determines a second sequence for ordering the payment instructions in the queue based upon the second set of rules, and
orders the payment instructions in the queue according to the second sequence.

14. A method for prioritizing processing of payment instructions through a payment instruction processing system of a business entity, the method comprising:
identifying a first set of rules determining a prioritization among a set of payment instructions including payment instructions related to payments from nostro accounts associated with the business entity and processed by other business entities, wherein the payment instructions have data fields for qualitative and quantitative attributes describing the payment instructions;
holding and ordering the payment instructions in a queue;
determining a first sequence ordering the payment instructions in the queue based upon the first set of rules;
initiating processing, by a processor, of the payment instructions in the queue according to the first sequence;
receiving a user selection of a payment instruction from the queue to be processed out of order from the first sequence;
removing the selected payment instruction from the queue;
determining a second sequence for ordering the payment instructions in the queue based upon the first set of rules;
ordering the payment instructions in the queue according to the second sequence; and initiating processing of the payment instructions in the queue according to the second sequence, wherein a rule in the first set of rules includes a combination of parameters for determining a sequence for ordering the payment instructions in the queue, the parameters including a payment value amount,
a payment value date,
an originator identity,
a payment date,
a currency of payment, and
a country of a recipient.

15. The method of claim 14, the method further comprising:

associating the set of payment instructions with a plurality of different product processors of the business entity providing the payment instructions.

16. The method of claim 14, the method further comprising:

assigning an additional payment instruction to the queue;
determining a second sequence for ordering the payment instructions in the queue based upon the first set of rules;
ordering the payment instructions in the queue according to the second sequence; and
initiating processing of the payment instructions in the queue according to the second sequence.

17. The method of claim 14, comprising:
setting a time the queue is opened and a subsequent time the queue is closed in response to time parameter settings, wherein any instructions in the queue are not processed if the queue is closed.

18. The method of claim 14, the method further comprising:

identifying a second set of rules for determining a prioritization among a set of payment instructions, wherein the second set of rules includes a modification to the first set of rules or a new rule;
determining a second sequence for ordering the payment instructions in the queue based upon the second set of rules for determining the prioritization;
ordering the payment instructions in the queue according to the second sequence; and
initiating processing of the payment instructions in the queue according to the second sequence.

19. The method of claim 14, wherein the rule in the first set of rules includes additional parameters for determining the sequence for ordering the payment instructions in the queue, the additional parameters including a priority which is associated with the payment instructions in the queue,
a product-processor of the business entity,
a balance in a nostro account in the set of nostro accounts associated with the business entity, and
an identity of a business entity from the other business entities processing payments from the set of nostro accounts associated with the business entity.

20. The method of claim 14, wherein the payment instructions in the set of payment instructions are SWIFT messages.

21. The method claim 14, wherein initiating processing of the payment instructions in the queue includes determining data accesses to a data storage device according to the first sequence identifying an order for processing the payment instructions in the queue.

22. A non-transitory computer readable medium comprising instructions executable on at least one processor for executing a method for prioritizing processing of payment instructions through a payment instruction processing system of a business entity, the method comprising:

identifying a first set of rules determining a prioritization among a set of payment instructions including payment instructions related to payments from nostro accounts associated with the business entity and processed by other business entities, wherein the payment instructions have data fields for qualitative and quantitative attributes describing the payment instructions;
holding and ordering the payment instructions in a queue;
determining a first sequence ordering the payment instructions in the queue based upon the first set of rules;
initiating processing of the payment instructions in the queue according to the first sequence;
receiving a user selection of a payment instruction from the queue to be processed out of order from the first sequence;
removing the selected payment instruction from the queue;
determining a second sequence for ordering the payment instructions in the queue based upon the first set of rules;
ordering the payment instructions in the queue according to the second sequence; and
initiating processing of the payment instructions in the queue according to the second sequence, wherein a rule in the first set of rules includes a combination of parameters for determining a sequence for ordering the payment instructions in the queue, the parameters including a payment value amount,
a payment value date,
an originator identity,
a payment date,
a currency of payment, and
a country of a recipient.

23. The computer readable medium of claim 22, comprising instructions executable for a method further comprising:

associating the set of payment instructions with a plurality of different product processors of the business entity providing the payment instructions.

24. The non-transitory computer readable medium of claim 22, comprising instructions executable for a method further comprising:

assigning an additional payment instruction to the queue;
determining a second sequence for ordering the payment instructions in the queue based upon the first set of rules;
ordering the payment instructions in the queue according to the second sequence; and
initiating processing of the payment instructions in the queue according to the second sequence.

25. The non-transitory computer readable medium of claim 22, comprising instructions executable for a method further comprising:

setting a time the queue is opened and a subsequent time the queue is closed in response to time parameter settings, wherein any instructions in the queue are not processed if the queue is closed.

26. The non-transitory computer readable medium of claim 22, comprising instructions executable for a method further comprising:

identifying a second set of rules for determining a prioritization among a set of payment instructions, wherein the second set of rules includes a modification to the first set of rules or a new rule;
determining a second sequence for ordering the payment instructions in the queue based upon the second set of rules for determining the prioritization;

ordering the payment instructions in the queue according to the second sequence; and initiating processing of the payment instructions in the queue according to the second sequence.

27. The non-transitory computer readable medium of claim 22, wherein the rule in the first set of rules includes additional parameters for determining the sequence for ordering the payment instructions in the queue, the additional parameters including a priority which is associated with the payment instructions in the queue, a product-processor of the business entity, a balance in a nostro account in the set of nostro accounts associated with the business entity, and an identity of a business entity from the other business entities processing payments from the set of nostro accounts associated with the business entity.

28. The non-transitory computer readable medium of claim 22, comprising instructions executable for a method wherein initiating processing of the payment instructions in the queue includes determining data accesses to a data storage device according to the first sequence identifying an order for processing the payment instructions in the queue.

* * * * *